March 23, 1926.
H. H. BUSS
UTILITY TOOL FOR AUTOMOBILES
Filed Feb. 2, 1925
1,577,687
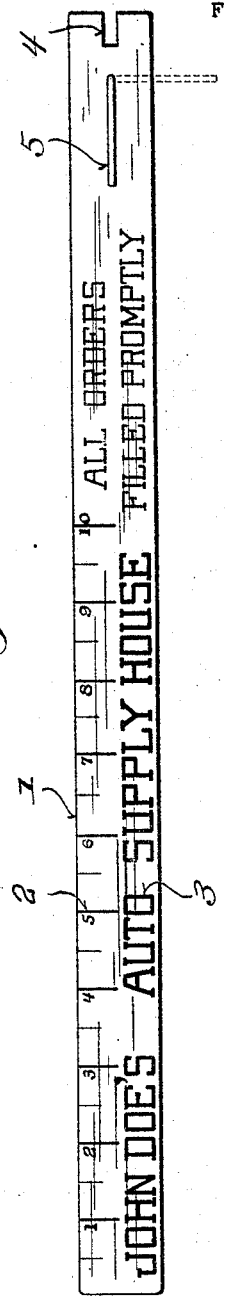
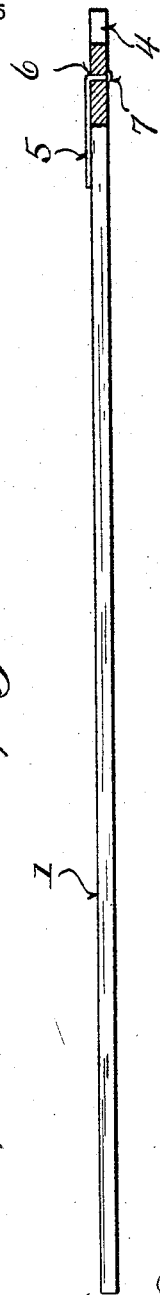
Inventor:
Harry H. Buss
By
Attorneys Patented Mar. 23, 1926.

1,577,687

UNITED STATES PATENT OFFICE.

HARRY H. BUSS, OF MERRILL, WISCONSIN.

UTILITY TOOL FOR AUTOMOBILES.

Application filed February 2, 1925. Serial No. 6,341.

*To all whom it may concern:*

Be it known that I, HARRY H. BUSS, a citizen of the United States, and resident of Merrill, in the county of Lincoln and State of Wisconsin, have invented certain new and useful Improvements in a Utility Tool for Automobiles; and I do hereby declare that the following is a full, clear, and exact description thereof.

This invention relates to a utility tool for use in connection with an automobile.

In using an automobile, it is the usual practice to carry a gage or measuring stick for determining the depth of gasolene in the supply tank. However, it is also necessary for the operator to determine the amount of oil in the crank case by opening the several pet cocks in succession until the oil level has been ascertained. It frequently happens that these pet cocks are stopped up and thus a faulty indication of the oil level results.

Further, these pet cocks are relatively inaccessible, and in addition to that, when they become stopped up it is difficult to find a suitable instrument to clean them and delay is consequently occasioned.

This invention is designed to overcome the above noted defects and objects of such invention are to provide a utility tool for the use of automobile drivers which, although adapted for measuring the depth of gasolene in the supply tank, is also adapted for opening and closing the pet cocks, and for cleaning the pet cocks when needed and to provide a tool which may be operated while the driver is in a convenient position, which thus eliminates soiling the driver's hands and clothes when investigating the oil level in the crank case.

Further objects are to provide a device which may be very cheaply and simply made, which is adapted to bear advertising and may thus be used as an advertising novelty in addition to its mechanical functions enumerated above.

An embodiment of the invention is shown in the accompanying drawings, in which:—

Figure 1 is a face view of the device, and

Fig. 2 is an edge view partly in section.

Referring to the drawings, it will be seen that the device preferably consists of a wooden ruler or measuring stick 1 which is provided with graduations 2 adjacent one edge thereof in order to indicate the depth of gasolene in the supply tank. Preferably, the device is relatively narrow and thin, as shown by the drawings, so that it may be readily stored, and also readily inserted in the filling mouth of the supply tank.

In addition to the graduations 2, the device preferably carries advertising insignia such as indicated at 3. One end of the measuring stick, preferably the end remote from the graduations, is provided with a rectangular notch 4 which is adapted to receive the thumb piece or manipulating portion of the pet cock to thus permit the opening and closing of the pet cock while the operator remains in a relatively remote position with reference to the pet cock.

A pin 5 is pivotally carried by the measuring stick 1, preferably by providing an angular portion 6 which is passed through the stick and is provided with an enlarged head 7 on the opposite side thereof, as shown clearly in Fig. 2.

In using the device for manipulating petcocks, it is merely necessary for the operator to slip the notched end into position, with the manipulating portion of the pet cock positioned within the notch 4. He then opens the pet-cock to ascertain the oil level. If the pet-cock is clogged, it is merely necessary for the operator to withdraw the stick and turn the pin 5 into the dotted line position shown in Fig. 1 at right angles to the body of the stick. He then inserts the wire into the pet-cock and frees such pet-cock of the obstructing matter. When the wire or pin is not in use it is normally carried in the position shown in full lines in Fig. 1, and is therefore out of the way.

It will be seen that a utility tool for automobiles has been provided which is extremely simple, which may be cheaply manufactured so that it may be used as an advertising novelty, and is so constructed that the operator may open and close the pet-cocks, and may clean the pet-cocks with the utmost facility and without danger of soiling his hands or clothes.

Although the invention has been described in considerable detail, it is to be understood that the invention may be variously embodied and is therefore to be limited only as claimed.

I claim:

A combined measuring stick and pet cock operating member comprising an elongated wooden strip having a notch at one end and having graduations thereon beginning at the other end thereof, a pin projecting through said member and having a head at one end, the other end of said pin being bent at right angles to retain it in position in pivotal relation to the said stick.

In testimony that I claim the foregoing I have hereunto set my hand at Merrill, in the county of Lincoln and State of Wisconsin.

HARRY H. BUSS.